No. 884,046.
PATENTED APR. 7, 1908.
J. SCHMID-ROOST.
BALL BEARING.
APPLICATION FILED OCT. 11, 1906.
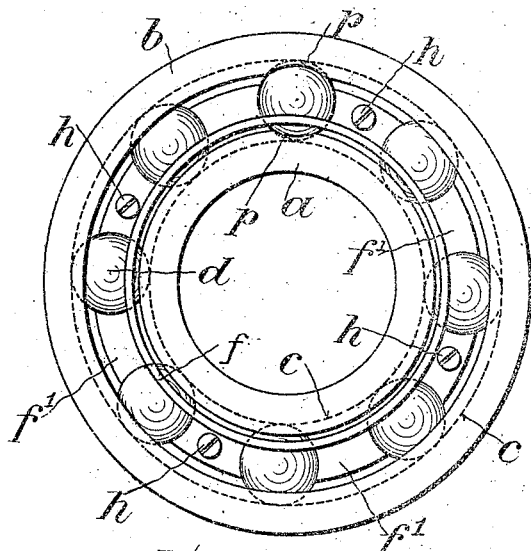
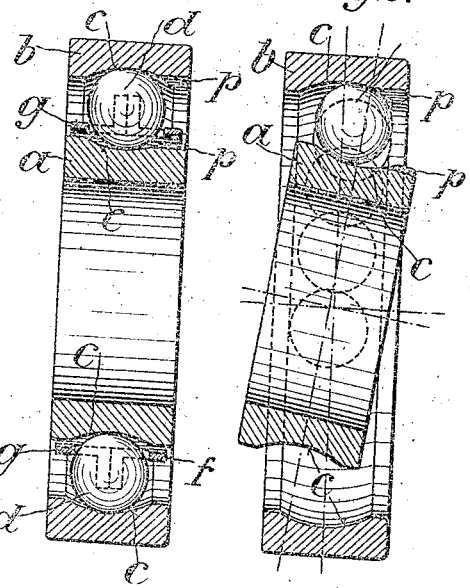
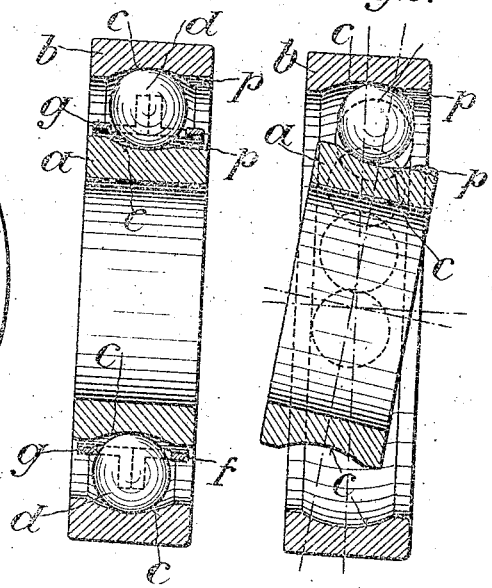
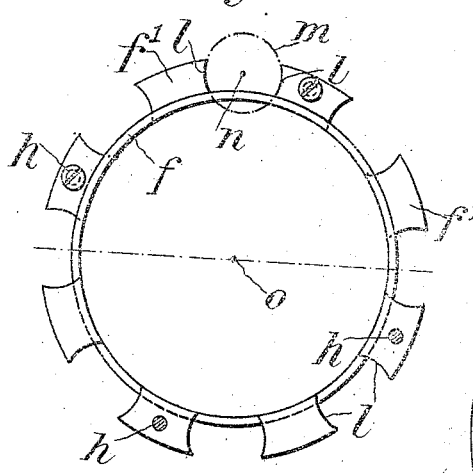
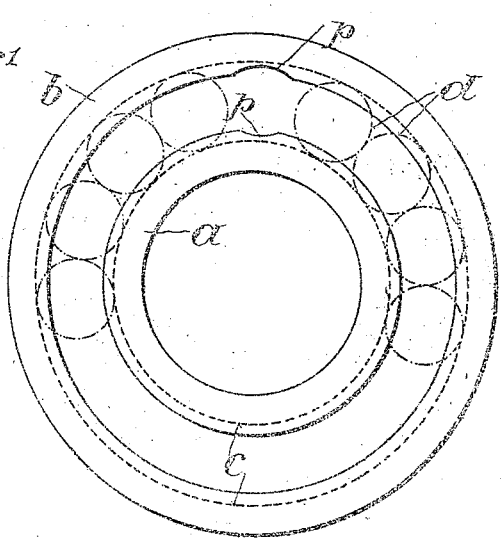
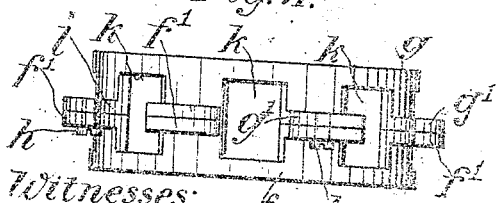
Witnesses:
Inventor:
Jakob Schmid-Roost,
by
Atty.

UNITED STATES PATENT OFFICE.

JAKOB SCHMID-ROOST, OF OERLIKON, NEAR ZURICH, SWITZERLAND.

BALL-BEARING.

No. 884,046.　　　Specification of Letters Patent.　　　Patented April 7, 1908.

Application filed October 11, 1906. Serial No. 338,508.

*To all whom it may concern:*

Be it known that I, JAKOB SCHMID-ROOST, a citizen of the Republic of Switzerland, residing at Oerlikon, near Zurich, in Switzerland, have invented certain new and useful Improvements in Ball-Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The subject of my invention is a ball bearing having two concentric bearing rings, grooved to present a raceway for the balls, and inclosing a spacing device for the balls between them.

The spacing device consists of twin rings of rectangular section, having webs that lie at right angles to the axis of the bearing detachably connected together. The spacing rings are notched to form recesses between the webs for the reception of the balls in such manner that when the balls are inserted in the recesses they are held at definite distances apart by the webs.

The two concentric bearing rings are each provided at one edge with a depression communicating with the raceway but not as deep as the latter, through which the balls can be introduced between the rings without the latter having, as hitherto, to be displaced eccentrically to each other in the same plane as it is only necessary to incline one of the rings laterally, without, however, eccentrically displacing it, so that the coinciding depressions of the two collars present a space longer than the diameter of the balls.

One form of construction of the new bearing is illustrated in the accompanying drawing in which, Figure 1 is an elevation. Fig. 2 a vertical cross section of the bearing-rings and ball-spacing device in operative position. Fig. 3 is an elevation and Fig. 4 a plan of the ball-spacing device. Fig. 5 is a cross sectional view showing the manner of inserting the balls. Fig. 6 is a side elevation of Fig. 5, after the balls have been inserted but before the spacing-device has been inserted.

The inner bearing ring $a$ and the concentric outer bearing ring $b$ are provided on their opposed faces with grooves $c$ constituting a raceway for the balls $d$. In cross section the raceway presents a flatter curve than the peripheries of the balls contained therein, the purpose of which will be hereinafter set forth. The ball-spacer comprises twin rings $f$ and $g$ (Figs. 3 and 4) having webs $f'$, $g'$ respectively, formed on the periphery of the rings at their inner edges, said inner edges having notches $k$ formed therein between the webs. When placed in position between the bearing-rings the webs are connected by screws or bolts $h$. The edges of the webs and notches are curved as shown at $l$, Fig. 3, and constitute a partial cylindrical casing, the axis $n$ of which passes through the center of a ball $d$ held therein and lies parallel to the axis $o$ of the rings $f$, $g$.

In order that the balls $d$ may be placed in the raceway without displacing the rings eccentrically, I provide a notch $p$ in one edge of each ring. In order to prevent liability of the balls escaping through the notches, said notches are of less depth than the grooves forming the raceway. As the perpendicular diameter of the raceway is substantially the same as the diameter of the balls, the diameter of the opening formed by the notches is less than the diameter of the balls.

To insert the balls in the raceway through the opening formed by the notches, said notches are brought opposite each other as shown in Fig. 6; but, as above stated, the opening is smaller in diameter than the balls and to permit the passages of the balls through the opening the latter is enlarged as shown in Fig. 5. To permit of such lateral movement when a number of balls are in the raceway, the curve of the grooves forming the raceway is made flatter than the curve of the periphery of the balls.

After the requisite number of balls have been inserted the spacing rings $f$ and $g$ are placed between the bearing rings and secured together by the bolts $h$ as above stated.

I claim:—

1. A ball bearing comprising two concentric bearing rings grooved to form a raceway, balls in the raceway a spacing device located between said rings comprising twin rings having notches formed therein and webs between the notches at right angles to the peripheries of the rings.

2. A ball bearing comprising two concentric bearing rings grooved to form a raceway, balls in the raceway a spacing device mounted between the rings comprising twin rings having notches formed in one edge thereof and webs having curved edges formed between the notches at right angles to the axis of the bearing.

3. A ball bearing comprising two concentric bearing rings having grooves formed in their opposing surfaces and a notch formed in one edge of each ring extending to but of less depth than the groove, balls between the rings a spacing-device mounted between the bearing rings comprising twin members having recesses formed in one edge and webs having edges conforming to the peripheries of the balls between the recesses at right angles to the axis of the bearing.

4. A spacing device for ball bearings comprising two rings of rectangular section detachably connected at their webs, said attached webs presenting recesses corresponding with recesses in the rings proper, the edges of the webs constituting portions of a cylindrical casing the axis of which passes through the center of a ball laid in the recess and lies parallel to the axis of the rings.

In testimony that I claim the foregoing as my invention, I have signed my name in presence of two subscribing witnesses.

JAKOB SCHMID-ROOST.

Witnesses:
A. LIEBERKNECHT,
E. BLUM.